(12) United States Patent
Inanc et al.

(10) Patent No.: US 9,261,612 B2
(45) Date of Patent: Feb. 16, 2016

(54) NUCLEAR RADIATION DETECTOR CALIBRATION DOWNHOLE

(71) Applicant: Baker Hughes Incorporated, Houston, TX (US)

(72) Inventors: Feyzi Inanc, Spring, TX (US); Daniel T. Georgi, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 72 days.

(21) Appl. No.: 13/871,782

(22) Filed: Apr. 26, 2013

(65) Prior Publication Data

US 2015/0001383 A1    Jan. 1, 2015

(51) Int. Cl.
| | |
|---|---|
| *G01T 7/00* | (2006.01) |
| *G01V 5/08* | (2006.01) |
| *G01V 13/00* | (2006.01) |
| *G01T 1/40* | (2006.01) |
| *G01V 5/10* | (2006.01) |
| *G01V 5/12* | (2006.01) |
| *G01V 11/00* | (2006.01) |

(52) U.S. Cl.
CPC . *G01T 7/005* (2013.01); *G01T 1/40* (2013.01); *G01V 5/08* (2013.01); *G01V 5/10* (2013.01); *G01V 5/12* (2013.01); *G01V 13/00* (2013.01); *G01V 11/00* (2013.01)

(58) Field of Classification Search
CPC ............ G01V 5/101; G01V 5/04; G01V 5/12
USPC .................................................... 250/252.1
See application file for complete search history.

(56) References Cited

U.S. PATENT DOCUMENTS

| | | | |
|---|---|---|---|
| 2,303,688 A | | 12/1942 | Fearon |
| 2,648,778 A | | 8/1953 | Silverman et al. |
| 2,934,652 A | | 4/1960 | Caldwell et al. |
| 2,945,129 A | | 7/1960 | Swift et al. |
| 2,956,165 A | | 10/1960 | Johnson |
| 3,113,087 A | | 12/1963 | Codrington |
| 3,869,608 A | * | 3/1975 | Scherbatskoy ................ 376/160 |
| 3,886,355 A | | 5/1975 | Culver |
| 4,055,763 A | * | 10/1977 | Antkiw ...................... 250/269.8 |

(Continued)

OTHER PUBLICATIONS

ISR and Written Opinion in PCT/US2014/035155, dated Aug. 25, 2014.

*Primary Examiner* — Marcus Taningco
(74) *Attorney, Agent, or Firm* — Mossman Kumar & Tyler PC

(57) ABSTRACT

Methods of evaluating a parameter of interest of a formation intersected by a borehole, including exposing a radiation sensor in the borehole to a calibration radiation source while a measurement operation using the radiation sensor is suspended. Methods may include exposing the radiation sensor to the calibration radiation source when the radiation sensor is stationary relative to the formation or during interruption of drilling operations or at predetermined intervals; processing response information, including performing a mitigation process on a portion of the response information relating to exposure of the radiation sensor to a calibration radiation source during measurement operations; or using the calibrated measurement information to estimate parameters of interest. Devices may include a radiation sensor, a calibrator including a calibration radiation source, and an actuator configured to intermittently expose the radiation sensor to the calibration radiation source. The radiation sensor may be a spectral gamma ray detector.

19 Claims, 6 Drawing Sheets

(56) References Cited

U.S. PATENT DOCUMENTS

| | | | |
|---|---|---|---|
| 4,228,350 A | 10/1980 | Paap et al. | |
| 4,349,736 A | 9/1982 | Miller | |
| 4,409,480 A * | 10/1983 | Givens | 250/252.1 |
| 4,480,186 A | 10/1984 | Wolk | |
| 4,857,728 A | 8/1989 | Smith, Jr. | |
| 5,171,986 A | 12/1992 | Loomis et al. | |
| 5,910,654 A | 6/1999 | Becker et al. | |
| 6,649,906 B2 | 11/2003 | Adolph et al. | |
| 7,142,109 B1 * | 11/2006 | Frank | 340/539.26 |
| 7,202,456 B2 | 4/2007 | Mickael | |
| 7,253,401 B2 | 8/2007 | Mickael et al. | |
| 7,482,578 B2 | 1/2009 | Randall et al. | |
| 7,718,955 B2 | 5/2010 | Pemper et al. | |
| 8,173,953 B2 | 5/2012 | Stoller et al. | |
| 8,294,084 B2 | 10/2012 | Troxler et al. | |
| 2005/0127282 A1 | 6/2005 | Grau et al. | |
| 2005/0156146 A1 * | 7/2005 | Leveille | 252/521.1 |
| 2006/0017442 A1 | 1/2006 | Folberth et al. | |
| 2006/0065824 A1 * | 3/2006 | Mickael | 250/252.1 |
| 2007/0241275 A1 | 10/2007 | Guo et al. | |
| 2008/0265151 A1 | 10/2008 | Gadot | |
| 2009/0146073 A1 * | 6/2009 | Stein et al. | 250/370.11 |
| 2012/0200421 A1 | 8/2012 | Duraj | |
| 2013/0134304 A1 * | 5/2013 | Beekman et al. | 250/269.6 |

* cited by examiner

NUCLEAR RADIATION DETECTOR CALIBRATION DOWNHOLE

FIELD OF THE DISCLOSURE

In one aspect, this disclosure generally relates to methods, devices and systems for estimating at least one parameter of interest relating to a volume using nuclear radiation based measurements.

BACKGROUND OF THE DISCLOSURE

Using nuclear techniques to investigate volumes of either organic or inorganic matter is well known. For example, naturally radioactive elements are commonly found in earth formations in various proportions, depending on the type of lithology and other factors. Radioactive isotopes of potassium, uranium, and thorium are typical regularly occurring naturally radioactive elements commonly quantified in the petroleum industry.

A rigid or non-rigid conveyance device is often used to convey one or more nuclear radiation detectors into a borehole intersecting the earth formation, often as part of a tool or a set of tools. There, the detector(s) may be used to estimate radiation associated with a volume of interest of the earth formation by generating a response to the one or more types of nuclear radiation detected. The response may be indicative of the nuclear radiation (e.g., gamma rays) present in the near-borehole environment during measurement. This response may then be used to estimate a parameter of interest of the volume. In nuclear logging, additional radioactive isotopes may be generated by providing radiation (e.g., neutron bombardment) to the formation. The detected nuclear radiation may be expressed as an energy spectrum (the "response spectrum"). "Response spectrum" refers to not only the response spectrum as originally acquired, but also after filtering, corrections, or pre-processing is applied.

Oil well logging has been known for many years and provides an oil and gas well driller with information about the particular earth formation being drilled. One or more parameters of interest of the earth formation obtained as above may relate to hydrocarbon exploration or production. For example, the parameter of interest may provide indications of the location and extent of hydrocarbons in a given earth formation.

SUMMARY OF THE DISCLOSURE

In aspects, the present disclosure is related to methods of evaluating a parameter of interest of a formation intersected by a borehole. The method may include intermittently exposing a radiation sensor in the borehole to a calibration radiation source. The method may include exposing the radiation sensor to the calibration radiation source while a measurement operation using the radiation sensor is suspended. The method may also include any of: exposing the radiation sensor to the calibration radiation source when movement of the radiation sensor in the borehole falls below a threshold value, exposing the radiation sensor to the calibration radiation source during a period of time in which the radiation sensor is stationary relative to the formation, or using the calibrated measurement information to estimate the parameter of interest. The exposure and the suspension may occur at predetermined time intervals. The radiation sensor may be a spectral gamma ray detector.

The method may include exposing the radiation sensor to the calibration radiation source during interruption of drilling operations wherein the radiation sensor is associated with a drilling assembly, and optionally exposing the radiation sensor to the calibration radiation source when rotation of a component of the drilling assembly falls below a threshold value.

The method may include conducting measurement operations in the borehole by processing a response from the radiation sensor with measurement circuitry before the exposure to produce measurement information; conducting calibration operations by processing a calibration response from the radiation sensor with the measurement circuitry during the exposure to produce calibration information; and conducting measurement operations by processing another response from the radiation sensor with the measurement circuitry after the exposure to produce calibrated measurement information in dependence upon the calibration information.

Another method embodiment may include processing response information from a radiation sensor in the borehole to produce measurement information, wherein the processing comprises performing a mitigation process on a portion of the response information relating to exposure of the radiation sensor to a calibration radiation source during measurement operations. The mitigation process may include at least one of i) removing the portion; ii) associating the portion with an indication of exposure; and iii) according less weight to the portion with respect to remaining portions. Performing a mitigation process on the portion of the response information relating to exposure may include performing the mitigation process on a portion correlated to a time period relating to exposure. The method may include exposing the radiation sensor in the borehole to the calibration radiation source at predetermined intervals. The method may include conducting measurement operations by processing a response from the radiation sensor with measurement circuitry to produce the response information; and exposing the radiation sensor to the calibration radiation source during measurement operations.

One embodiment according to the present disclosure may be an apparatus for estimating a parameter of interest of a formation intersecting a borehole. The apparatus may comprise a logging device including: a radiation sensor, a calibrator including a calibration radiation source selectably exposable to the radiation sensor, and an actuator configured to intermittently expose the radiation sensor to the calibration radiation source while the device is in the borehole. The apparatus may also include a carrier configured to convey the logging device into the borehole.

The calibrator may include i) a continuous radiation source and at least one shield member substantially preventing exposure of the continuous radiation source to the radiation sensor; ii) a fixture holding a continuous radiation source and movable to a first position providing exposure of the continuous radiation source to the radiation sensor and to a second position substantially preventing exposure of the continuous radiation source to the radiation sensor; and/or iii) a controllable source. The apparatus may be at least one of i) electronically controlled; ii) mechanically controlled; and iii) inertially controlled.

The apparatus may be configured to expose the radiation sensor to the calibration radiation source i) during suspension of measurement operations using the radiation sensor; ii) during suspension of drilling operations; iii) during predetermined intervals; or iv) in response to a command received from an operator.

The actuator may include a processor; and a non-transitory computer-readable medium accessible to the processor having instructions disposed thereon that, when executed, cause the at least one processor to expose the radiation sensor to the calibration radiation source.

Examples of features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
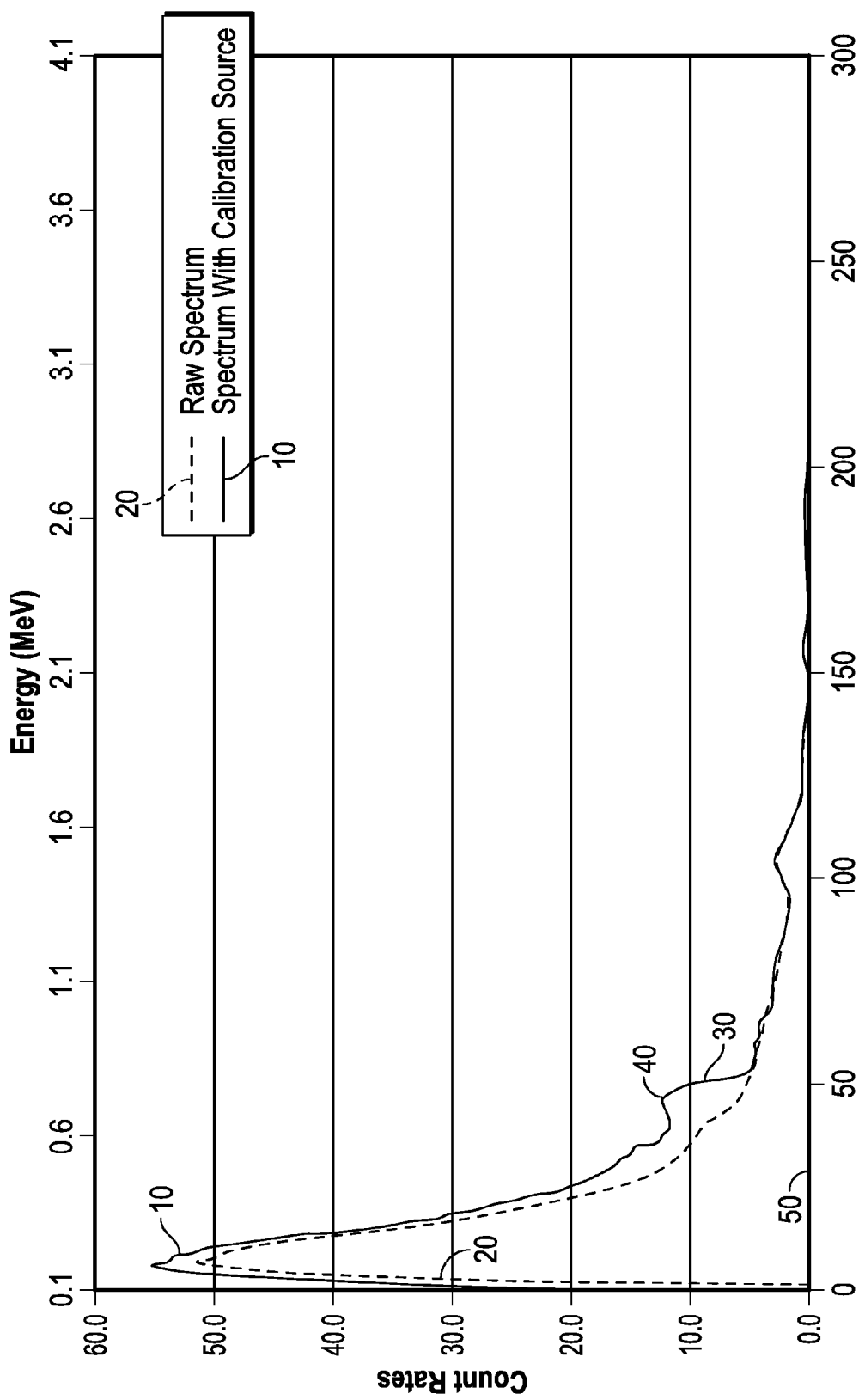
FIG. 1A illustrates a comparison of a gamma ray response spectrum corresponding to calibrated radiation information and another gamma ray response spectrum corresponding to calibrated radiation information polluted by exposure to a calibration source.

In aspects, this disclosure relates to detecting radiation from a volume, and particularly to calibrated radiation detection. Aspects of the present disclosure may relate to calibrating a radiation detector using a calibration radiation source, wherein the calibration minimizes effects on radiation information (e.g., an energy spectrum) resulting from exposure of the detector to the calibration radiation source.

In some aspects, this disclosure relates to estimating a parameter of interest related to a volume from calibrated detected radiation. The volume may be an earth formation, such as, for example, an earth formation surrounding a borehole. The parameter of interest may be a physical characteristic of the volume, such as, for example, elemental concentrations of naturally occurring radioactive material in a subterranean formation.

Illustrative methods for estimating a parameter of interest may include the acquisition and utilization of information characterizing calibrated detected radiation from one or more detectors. In many instances, the information used for these estimations may be acquired by tools deployed into a borehole intersecting one or more formations of interest. For context, an exemplary system for deploying and using such tools to acquire this information is described below with respect to FIG. 8. Each of these aspects may be referred to generally as investigation of the formation.

The formation may be exposed to energy from a radiation source. Downhole tools may include this radiation source and one or more detectors. Herein, the radiation source may include, but is not limited to, one or more of a neutron source, a gamma-ray source, and an x-ray source. The detectors may be used to detect radiation from the formation, though the detectors are not limited to detecting radiation of the same type as emitted by the radiation source. Detectors may have shielding to prevent the counting of radiation from unintended sources. Shielding of the detectors may be implemented for neutrons and gamma rays. Gamma ray shielding prevents the detection of gamma rays from behind the tool and from that originating within the tool. Neutron shielding prevents neutrons from reaching the detector regions and inducing gamma rays. Combinations of neutron moderators, neutron absorbers, high hydrogen content epoxies, and high-density high-Z materials are known to those skilled in the art.

In one common application of downhole radiation detection, the energy spectrum caused by radioactive decay of radionuclides may be used to estimate parameters of interest of an earth formation. The energy spectrum may be expressed in terms of magnitude (e.g., gamma ray counts per period of time) as a function of energy. The radioactive decay of radionuclides may produce nuclear radiation that may be detected by radiation detectors. Radionuclides may include naturally occurring radionuclides (such as potassium-40, and the uranium and thorium series), which exist in the earth formation, and activated radionuclides, which may include radionuclides activated from the irradiation of nuclides with nuclear radiation.

One or more of the detectors may include a scintillator component comprising a radiation responsive element (for example, a scintillator crystal or the like) which produces light scintillations in response to absorbing radiation (e.g., neutrons, gamma rays, etc.), and at least one light responsive device (e.g., a photomultiplier tube, other photomultiplier device, charge coupled silicon device, and so on) configured to produce an output representative of the respective light scintillations.

For the practical application of radiation information, continued calibration is desirable for precise detection and characterization of the radiation. Traditionally, calibration of the detector is carried out using a chemical calibration radiation source, or 'pill,' associated with the tool (and having known characteristics) as a reference. Use of the detector in such applications may involve calibrating the detector such that radiation information from detection of the source is consistent with information expected from the known characteristics. The chemical source provides constant radiation for continual calibration as desired.

In one example of such a practical application, a scintillator as described above may be employed in spectral gamma ray logging to estimate elemental concentrations of potassium-40, and the uranium and thorium series (collectively, 'KUT concentrations') in a volume. Because these elements emit gamma radiation at specific characteristic energies, components of radiation from each of the elements contributing to the total gamma ray spectrum may be determined by identifying the characteristic energies from a response spectrum using known methods of decomposition. Other naturally radioactive or activated elements may also be similarly identified. The elemental concentrations may then be subjected to various forms of processing and analysis to predict the location and extent of hydrocarbons in the formation.

For spectral gamma ray logging, precise measurement of the energy corresponding to each gamma ray is desirable. Due to changes in temperature and other environmental variations in the borehole, the gain of the photomultiplier may shift over time. Left unaddressed, these gain changes may skew the response spectrum. It is therefore common in some gamma ray logging systems to include gain control electronics for offsetting this gain change to maintain precise results. A chemical calibration radiation source as described above is often used in conjunction with gain control electronics. Cesium-137 and Americium-241 are typical sources. The chemical calibration radiation source generates one or more calibration peaks in the gamma ray spectrum at known energies (see calibration peak 40 at 0.662 MeV corresponding to Cs-137 exposure; FIG. 1A). Discrepancies between the known energy of the peak(s) and the response spectrum may be used to correct the gain and calibrate the device. Due to the continual change of conditions, continual calibration of the device is desired during measurement in the borehole.

However, continuous exposure to the calibration radiation source is problematic. Calibration radiation sources of sufficient strength may provide accurate calibration, but may contaminate the radiation information, especially at lower energies, as shown in FIG. 1A. FIG. 1A illustrates a comparison of a gamma ray response spectrum 20 corresponding to "clean" calibrated radiation information and another gamma ray response spectrum 30 corresponding to calibrated radiation information polluted by exposure to a chemical Cesium-137 calibration source. The range of response energies are assigned to energy channels 50. When the radiation information is calibrated, the gain is adjusted to a gain such that specific energies fall within (e.g., correspond to) particular channels, known as standard gain (i.e., reference conditions). As can been seen, the total gamma ray energy in the 0.0-1.0 MeV range of gamma ray response spectrum 30 is greater than in gamma ray response spectrum 20, due to inaccuracies in the response spectrum introduced by the exposure. Because the low energy segment of the spectrum is used to compute the total gamma ray, it is desirable to eliminate low energy gamma ray pollution from detected gamma ray information.

Use of a weaker source (or elimination of the source altogether) is not practical, as it often results in misidentification of peaks. For example, on typical instrumentation settings, Americium-241 occupies very few channels of the spectrum, making precise calibration difficult and introducing the possibility of statistically significant error in calibration. Elimination of the calibration source altogether further increases statistical error. This problem is especially relevant in logging while drilling ('LWD') applications, as the thickness of the metallic drill collar results in relatively low counts that exacerbate the decrease in accuracy.

In the field of spectral gamma ray logging, it would be desirable to restore the obtained spectra to a reference condition before any processing is done to ensure accurate spectral decompositions. It would also be desirable to enable the use of a calibration radiation source in connection with spectral gamma ray logging to bring the raw spectra back to reference conditions (i.e., where distortions from gain changes resulting from changes in borehole conditions are mitigated) while minimizing pollution of the radiation data.

Further description of embodiments minimizing pollution of radiation information resulting from exposure of a detector to a calibration radiation source follows.

General embodiments in accordance with the invention may include systems, devices, and methods for calibrated radiation detection with reduced pollution of radiation information. In some embodiments, a radiation sensor in the borehole may be intermittently exposed to a calibration radiation source. In some embodiments, a radiation sensor in the borehole may be exposed to a calibration radiation source while a measurement operation using the radiation sensor is suspended. Other embodiments may include performing a mitigation process on a portion of response information relating to exposure of the radiation sensor to a calibration radiation source during measurement operations.

Figure 1B:
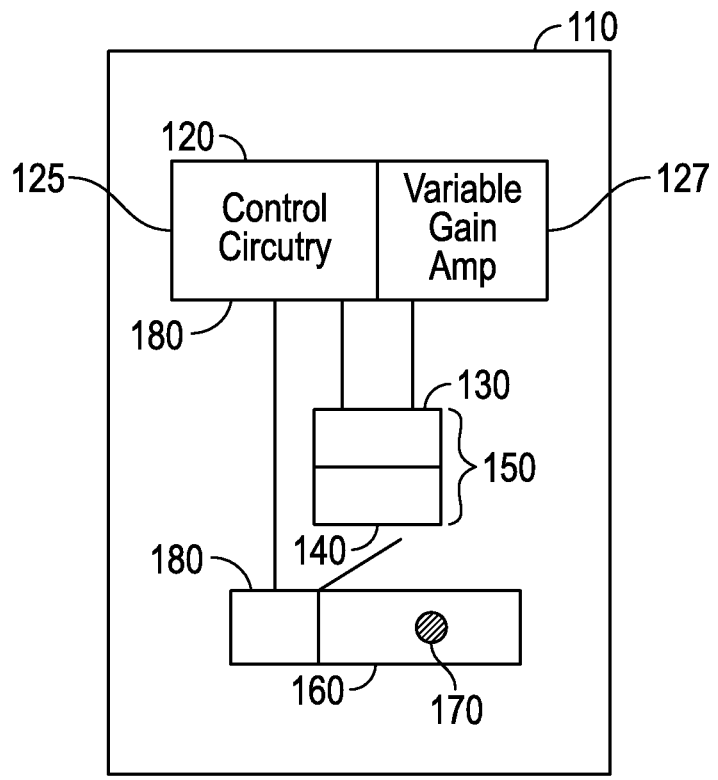
FIG. 1B illustrates a device having a sensor in accordance with embodiments of the present disclosure.

FIG. 1B illustrates a device 110 having a sensor (scintillator) 150 in accordance with embodiments of the present disclosure. The sensor 150 includes a light responsive device 130 and at least one radiation responsive element 140. The radiation responsive element 140 may comprise a scintillation crystal such as NaI, CsI, BGO; glass doped with isotopes of one or more of lithium (e.g., Li-6, Li-7), cerium, europium, praseodymium, and terbium; or other suitable material. The light responsive device 130 (e.g., photomultiplier tube) is optically coupled to the radiation responsive element 140 at one end, such that light scintillations occurring in the element are converted to electrical signals. Processing circuitry 120 receives output (e.g., voltage) from the light responsive device 130 indicative of luminescent activity of the element 140. The processing circuitry 120 processes the output to produce radiation information indicative of the output. The processing circuitry 120 records the radiation information and/or transmits the radiation information to the surface. This process of acquiring radiation information using the sensor 150 and processing circuitry 120 may be referred to generally as measurement.

The dimensions of the element 140 or other characteristics of sensor 150 may be specifically configured to increase or reduce detection of specific types of radiation (e.g., gamma rays, thermal neutrons, fast neutrons, etc.). Element 140 may be solid or hollow, and may be formed to any shape. In further embodiments, element 140 may comprise an aggregate of a plurality of rods, sheets, beads, or other shapes comprised of one or more radiation responsive materials, a radiation responsive powdered material, and so on. Device 110 may further include shielding to increase effectiveness of the sensor 150 as known in the art.

In addition to measurement, a second characteristic function of device 110 is calibration, which generally refers to adjustment of the measurement process described above using reference radiation from a calibration radiation source 170. Calibration radiation source 170 may have at least one known characteristic energy peak. Calibration in the context of device 110 may occur during a calibration period. The calibration period refers to the period of exposure of sensor 150 to the calibration radiation source.

Processing circuitry 120 may include a variable gain amplifier 127 or other similar circuitry. Processing circuitry 120 may also include control circuitry 125 for enabling the operation of one or more systems, sub-systems, or functions of device 110, either autonomously or in coordination with operator instructions. Processing circuitry 120 may include at least one processor, and at least one computer readable medium accessible to the processor(s) having instructions disposed thereon that when executed by the processor cause the processor to carry out methods of the present disclosure.

During the calibration period, calibration information may be obtained. Calibration information may be applied advantageously for at least one of adjusting the data signal and adjusting controls or response of the device (e.g., sensor or processing circuitry). During the calibration period, the control circuitry 215 may adjust the variable gain amplifier to carry out calibration as described above to reduce gain-based distortions resulting from changes in borehole conditions. The control circuitry 125 may alternatively acquire calibration information during the calibration period, and adjust the control circuitry or radiation information during a later period. The control circuitry may be configured to adjust the variable gain amplifier or the like to reconcile differences between the known characteristic energy peak of the calibration radiation source 170 and a measured peak on the response spectrum identified as the corresponding measured peak, according to known calibration processes. This process may be iterative and/or employ negative feedback.

In addition to calibration radiation source 170, device 110 further includes a calibrator 160 having an actuator 180 associated therewith. Calibrator 160 is configured to selectably expose the calibration radiation source 170 to the radiation sensor 150. Actuator 180 is configured to effect brief intermittent exposure of the radiation sensor 150 to the calibration radiation source 170 with calibrator 160 while the device is in the borehole.

In operation, actuator 180 allows extended periods of measurement by sensor 150 without exposure of sensor 150 to the calibration radiation source 170 and also intermittently provides calibration periods. During the calibration period, actuator 180 uses calibrator 160 to expose sensor 150 to the calibration radiation source 170. The duration of the calibration period may be on the order of seconds (e.g., 1, 2, 3, 4, 5, 10, 15, 20, 30, or 45 seconds, etc.) or in some cases minutes (1, 2, 3, 4, 5, or 10 minutes, etc.). An example calibration period may last approximately 15 seconds. Device 110 may be configured such that the calibration process may take place during a period when the sensor is substantially still with respect to the borehole, such that no data of interest is being recorded. This may result in radiation information that may be more robust and complete. For example, in the LWD context, the drill string may be halted regularly to add or remove segments of drill pipe. Drilling mud circulation may also be halted. A calibration period of less than 20 seconds may allow calibration during suspension of measurement in during addition or removal of a drill pipe segment or other momentary lapses in acquiring new (e.g., non-redundant) radiation information characteristic to borehole operations. In other applications, calibration may take place during movement to increase calibration without increasing operation time. In some implementations, suspension and calibration may be configured to occur at predetermined intervals (e.g., time or distance), or upon being triggered (for example, by an operator), while the device 110 is in either a stationary or moving state. In some cases, the intervals may be chosen such that suspension occurs while the tool is adjacent to portions of the formation that are well known or designated as non-priority.

In a first general embodiment, actuator 180 causes intermittent exposure of sensor 150 to the calibration radiation source 170. Exposure may occur during suspension of measurement. Exposure may occur only during suspension of measurement, such that no pollution of measurement data occurs, or some overlap between measurement and exposure may occur, such that pollution is limited. Various mechanical, hydraulic, electronic, or processor based triggering mechanisms may be employed in actuator 180 to activate exposure, as discussed in greater detail with reference to FIGS. 2-5 below. Actuator 180 may be responsive to physical conditions relating to the device 110, the carrier 115, or other components of the borehole system. For example, actuator 180 may be responsive to weight-on-bit ('WOB'), angular velocity, torque, orientation, velocity along or perpendicular to the borehole or to other reference axes, and so on. Actuator 180 may be responsive to a state of the device 110, the carrier 115, or other components of the borehole system.

Actuator 180 may be one or more of i) electronically controlled; ii) mechanically controlled; and iii) inertially controlled. Electronic control may include the use of one or more processors. Actuator 180 may include control circuitry 125 configured to intermittently expose the radiation sensor to the calibration radiation source while the device is in the borehole using the calibrator 160. Control circuitry 125 may include at least one processor, and at least one computer readable medium accessible to the processor(s) having instructions disposed thereon that when executed by the processor cause the actuator to intermittently expose the radiation sensor to the calibration radiation source while the device is in the borehole.

Figure 2:
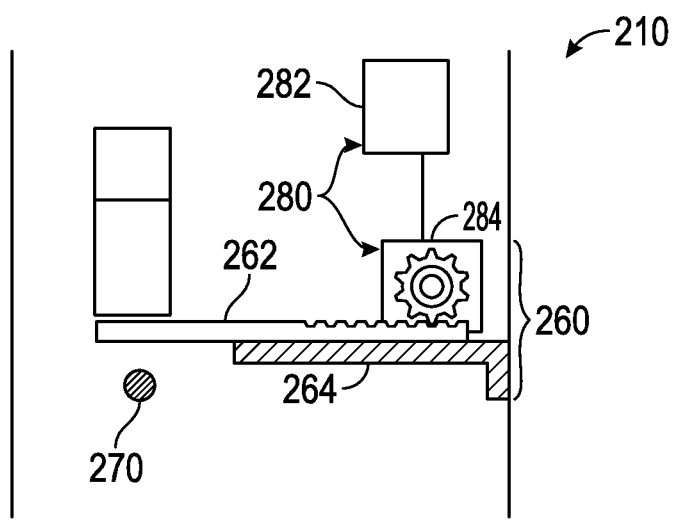
FIG. 2 illustrates device having an actuator in accordance with embodiments of the present disclosure.

FIG. 2 illustrates device having an actuator in accordance with embodiments of the present disclosure. Device 210 includes a continuous radiation source 270 and a calibrator 260 including shield member 262. In its nominal position, shield member 262 substantially prevents exposure of the continuous radiation source to the radiation sensor during a non-calibration period (e.g., during measurement). Actuator 280 may include an electronic controller 282 and an electric, pneumatic, or hydraulic motor 284. Upon actuation by electronic controller 282, motor 284 retracts shield member 262 along track member 264 until shield member achieves a calibration position. The calibration position allows exposure of the continuous radiation source 270 to the radiation sensor 250 during the calibration period. At the end of the calibration period, motor 284 may return shield member 262 to its nominal position through reverse actuation, or shield member 262 may return to its nominal position in the absence of actuation through application of a biasing member (e.g., a spring, elastomeric member, pressure responsive membrane, etc.).

Figure 3:
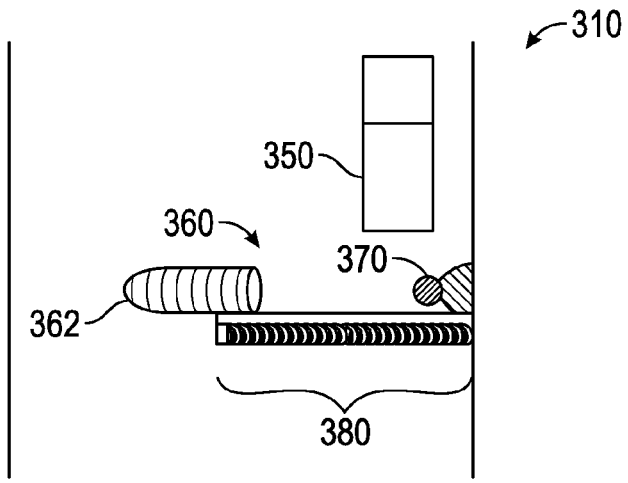
FIG. 3 illustrates a device having an inertially controlled actuator in accordance with embodiments of the present disclosure.

FIG. 3 illustrates a device having an inertially controlled actuator in accordance with embodiments of the present disclosure. Device 310 includes a continuous radiation source 370 and a calibrator 360 including shield member 362 ('shield tube'). Actuator 380 may include biasing member 384. In its nominal position, shield tube 362 substantially prevents exposure of the continuous radiation source to the radiation sensor during a non-calibration period (e.g., during rotation of the drill string (carrier 115) and device 210). Rotation of the drill string during drilling operations at a velocity above a threshold value creates an inertial force sufficient to maintain shield tube 362 in its nominal position. Actuator 380 actuates calibrator 360 upon rotation of the device falling below a predetermined threshold, whereupon biasing member 384 retracts shield tube 362 along track member 364 until shield member achieves a calibration position. The calibration position allows exposure of the continuous radiation source 370 to the radiation sensor 350 during the calibration period. At the end of the calibration period (when drilling operations resume and the drill string and device achieve a threshold angular velocity), centrifugal force overcomes the biasing member and returns shield tube 362 to its nominal position.

Figure 4:
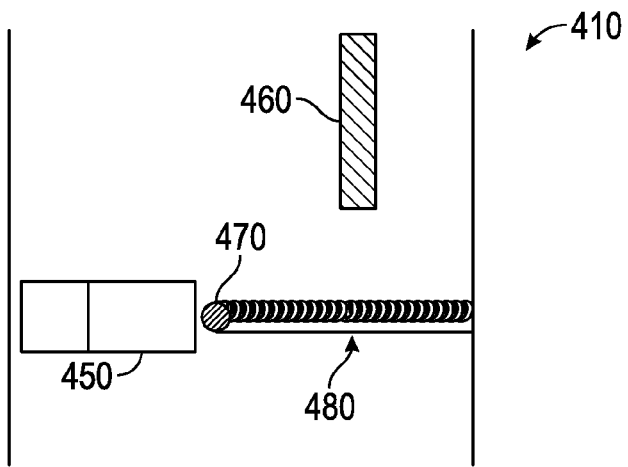
FIG. 4 illustrates another device having an inertially controlled actuator in accordance with embodiments of the present disclosure.

FIG. 4 illustrates another device having an inertially controlled actuator in accordance with embodiments of the present disclosure. Device 410 includes a continuous radiation source 470 and a calibrator 460 including optional shield member 462 ('shield wall'). Actuator 480 may include source fixture 482 and biasing member 484. Fixture may travel along track member 464. Fixture 482 holds a continuous radiation source 470 and is movable to a first position (calibration position) providing exposure of the continuous radiation source 470 to the radiation sensor 450; and to a second position (nominal position) substantially preventing exposure of the continuous radiation source 470 to the radiation sensor 450. The second position may prevent exposure due to the distance between source 470 and sensor 450, due to the relative position of the shield wall 462 with respect to the source 470 and sensor 450, or both.

Rotation of the drill string during drilling operations at a velocity above a threshold value creates an inertial force sufficient to maintain fixture 482 (and source 470) in its nominal position. Actuator 480 actuates calibrator 460 upon rotation of the device falling below a predetermined threshold, whereupon biasing member 484 retracts fixture 482 along track member 464 until fixture 482 achieves a calibration position. The calibration position allows exposure of the continuous radiation source 470 to the radiation sensor 450 during the calibration period. At the end of the calibration period (when drilling operations resume and the drill string and device achieve a threshold angular velocity), centrifugal force overcomes the biasing member and returns fixture 482 to its nominal position.

In other embodiments, the shield member may be implemented as shutters, doors, walls, hatches, closable apertures, and so on, or as combinations of the same. Relative movement of the source with respect to the sensor may also be combined with the use of one or more shield members. The above actuator embodiments are susceptible to multiple variations, including orientation of the components, the use of mechanical or hydraulic linkages, the specific movement of the various components, and the means of activation.

Figure 5:
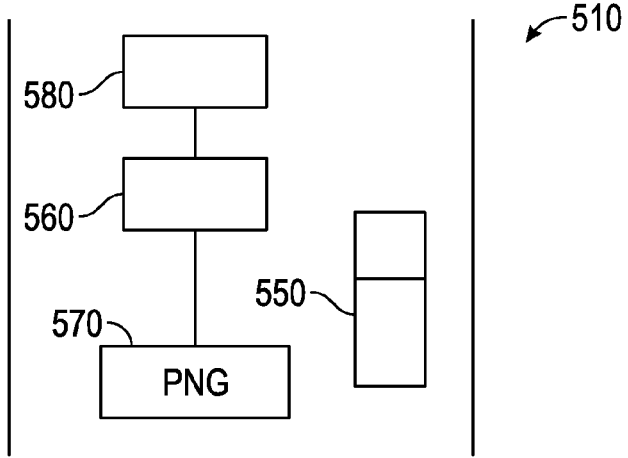
FIG. 5 illustrates a device having a controllable source in accordance with embodiments of the present disclosure.

FIG. 5 illustrates a device having a controllable source in accordance with embodiments of the present disclosure. Device 510 includes a controllable radiation source 570, such as, for example, a pulse neutron generator ('PNG'), and a calibrator 560 (e.g., electronics) causing source 570 to emit radiation, exposing the continuous radiation source 570 to the radiation sensor 550. Actuator 580 may be implemented as an electronic controller. Upon actuation by actuator 580, calibrator 560 causes source 570 to emit radiation, such as for example, neutrons, for a predetermined time period. A brief time (less than one second) after the cessation of radiation emission, exposure of the continuous radiation source 570 to the radiation sensor 550 ends.

In a second general embodiment, intermittent periods of exposure during measurement are accounted for using a mitigation process. Exposure may be carried out with device 110, as described above. Exposure may occur during specific periods as described above, such as, for example, during a period when the sensor is substantially still with respect to the borehole, or exposure may occur at other intervals. A calibration period may interrupt measurement by sensor 150, or the calibration period may overlap with measurement, up to and including the entire calibration period. Periods of exposure may coincide with times that no data of interest is being recorded. For example, when the device is stationary with respect to the borehole, data recorded may be redundant data.

Figure 6:
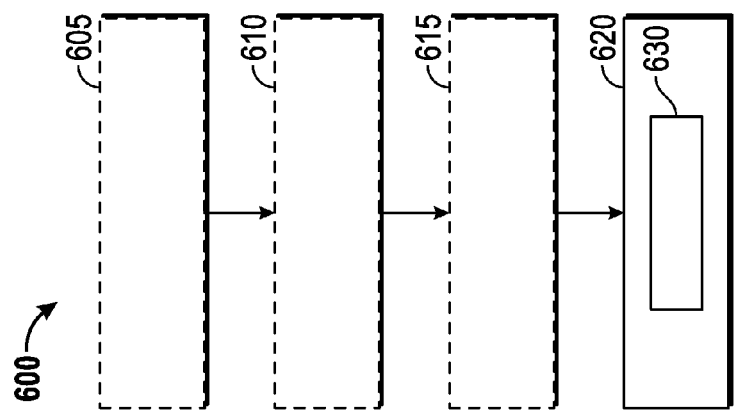
FIG. 6 shows one method for evaluating radiation information in accordance with embodiments of the present disclosure.

FIG. 6 shows, in flow chart form, one method 600 according to the present disclosure for evaluating a parameter of interest of a formation intersected by a borehole. Referring now to FIGS. 1 and 6, method 600 may include optional step 615, exposing a radiation sensor in the borehole to a calibration radiation source during measurement operations. Step 620 may include processing response information received from the radiation sensor during measurement to produce measurement information. Processing step 620 includes a sub-step 630 of performing a mitigation process on a portion of the response information relating to exposure of the radiation sensor to a calibration radiation source during measurement operations. Sub-step 630 may be carried out by removing the portion; ii) associating the portion with an indication of exposure; and/or iii) according less weight to the portion with respect to remaining portions. Thus, the effects of polluted data are reduced.

If the periods of exposure are predetermined or are noted with respect to a universal clock, sub-step 630 may be carried out by performing the mitigation process on a portion of the response information correlated to a time period relating to exposure. Periods of exposure may be noted by recording the beginning and end time of the exposure in a computer memory.

Method 600 may include optional step 610, conducting measurement operations by processing a response from the radiation sensor with measurement circuitry to produce the response information. Method 600 may include optional step 605, irradiation of nuclides in the borehole with nuclear radiation to form radionuclides.

Figure 7:
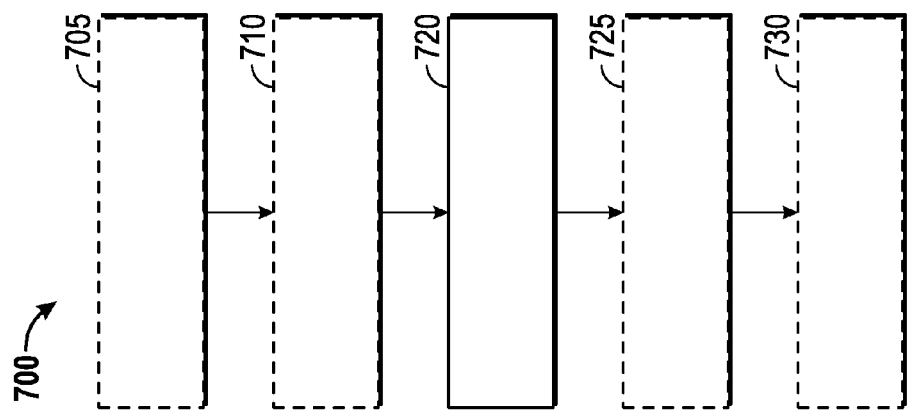
FIG. 7 shows, in flow chart form, one method for calibrating a radiation sensor in a borehole intersecting an earth formation in accordance with embodiments of the present disclosure.

FIG. 7 shows, in flow chart form, one method 700 according to the present disclosure for calibrating a radiation sensor in a borehole intersecting an earth formation. Referring now to FIGS. 1 and 7, method 700 may include step 720, intermittently exposing a radiation sensor in the borehole to a calibration radiation source. Step 720 may be carried out by exposing the radiation sensor in the borehole to the calibration radiation source while a measurement operation using the radiation sensor is suspended. Suspension of measurement to allow calibration may be most practical during periods when movement of the sensor proceeds at a rate lower than the nominal operating rate. Little to no features/area of the borehole would be measured in the case that measurements had continued.

Measurement may be suspended in response to a command from an operator or when a change in operations of the device is detected. Measurement may be suspended when movement of the radiation sensor in the borehole falls below a threshold value. This may relate to movement along the axis of the borehole, along the axis of the tool, rotational motion, or motion from any other frame of reference. In some embodiments, step 720 may be carried out during a period of time in which the radiation sensor is stationary relative to the formation.

In drilling operations using drill pipe, it may be desirable to align the calibration period with the cessation of drilling, for example, in connection with addition or removal of pipe segments. Thus, in particular embodiments, step 720 may be carried out by exposing the radiation sensor to the calibration radiation source when rotation of a component of the drilling assembly falls below a threshold value.

Method 700 may include may include optional step 710, conducting measurement operations in the borehole by processing a response from the radiation sensor with measurement circuitry before the exposure to produce measurement information. Optional step 725 may include conducting calibration operations by processing a calibration response from the radiation sensor with the measurement circuitry during the exposure to produce calibration information. Optional step 730 may include conducting measurement operations by processing another response from the radiation sensor with the measurement circuitry after the exposure to produce calibrated measurement information in dependence upon the calibration information. Method 700 may also include optional step 705, irradiation of nuclides in the borehole with nuclear radiation to form radionuclides.

Figure 8:
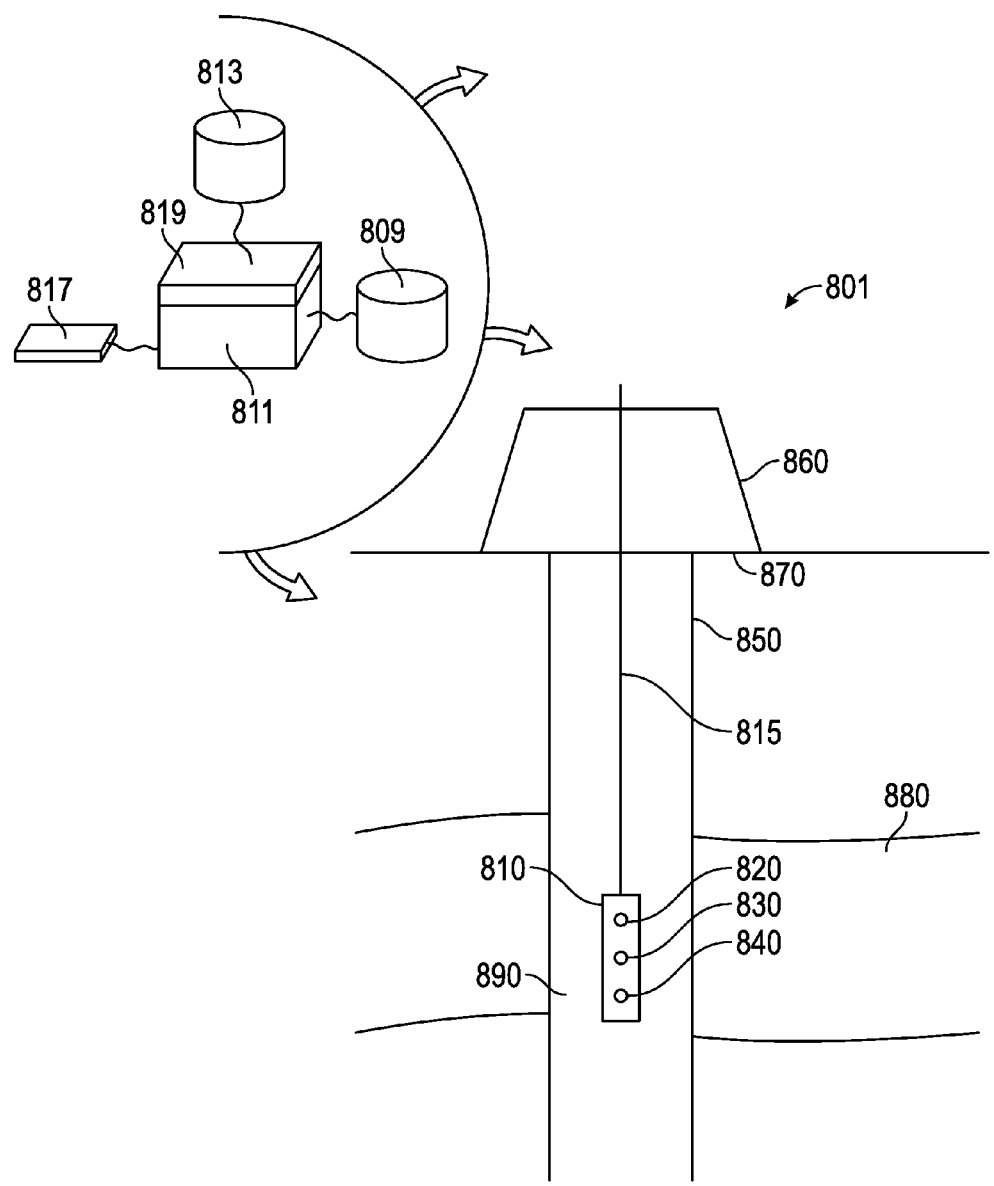
FIG. 8 schematically illustrates a drilling system having a downhole tool configured to acquire information for estimating a parameter of interest of a formation in accordance with embodiments of the present disclosure.

FIG. 8 schematically illustrates a drilling system 801 having a downhole tool 810 configured to acquire information for estimating porosity or another parameter of interest of a formation 880. In one illustrative embodiment, the tool 810 (e.g., device 110) may contain a radiation source 840 and associated sensors for detection, or detectors 820, and sensor 830 (e.g., sensor 150). Detector 820 may detect one or more parameters of a formation. Parameters of a formation may include information relating to a geological parameter, a geophysical parameter, a petrophysical parameter, and/or a lithological parameter. Thus, the detector 820 may include sensors for estimating formation resistivity, dielectric constant, the presence or absence of hydrocarbons, acoustic porosity, bed boundary, formation density, nuclear porosity and certain rock characteristics, permeability, capillary pressure, and relative permeability.

The system 801 may include a conventional derrick 860 erected on a derrick floor 870. A conveyance device (carrier 815, 115) which may be rigid or non-rigid, may be configured to convey the downhole tool 810 (e.g., device 110) into wellbore 850 in proximity to formation 880. The carrier 815, 115 may be a drill string, coiled tubing, a slickline, an e-line, a wireline, etc. Downhole tool 810 may be coupled or combined with additional tools (e.g., some or all the information processing system of FIG. 10). Thus, depending on the configuration, the tool 810 may be used during drilling and/or after the wellbore 850 has been formed. While a land system is shown, the teachings of the present disclosure may also be utilized in offshore or subsea applications. The carrier 815, 115 may include embedded conductors for power and/or data for providing signal and/or power communication between the surface and downhole equipment. The carrier 815, 115 may include a bottom hole assembly, which may include a drilling motor for rotating a drill bit.

The radiation source 840 emits radiation (e.g., neutrons) into the formation to be surveyed. In one embodiment, the downhole tool 810 may use a pulsed neutron generator emitting 14.2 MeV fast neutrons as its radiation source 840. The use of 14.2 MeV neutrons from a pulsed neutron source is illustrative and exemplary only, as different energy levels of neutrons may be used. In some embodiments, the radiation source 840 may be continuous. In some embodiments, the radiation source 840 may be controllable in that the radiation source may be turned "on" and "off" while in the wellbore, as opposed to a radiation source that is "on" continuously. The measurements performed using this type of radiation may be referred to as "sourceless" measurements since they employ a source that may be turned off, as opposed to a continuously emitting chemical radiation source.

Sensor 830 and optionally detector 820 provide signals that may be used to estimate the radiation counts (e.g., gamma ray or neutron counts) returning from the formation. Sensor 830 and detector 820 may be spaced in a substantially linear fashion relative to the radiation source. If two detectors are used, there may be a short spaced (SS) detector and a long spaced (LS) detector, wherein the detectors have different distances from the radiation source. Either of sensor 830 and detector 820 may be the SS detector or the LS detector. Both SS and LS detector may be implemented as sensor 830. The SS and LS detectors are not limited to being placed on the same side of the radiation source and their spacing from the radiation source may be equal or unequal. Additional detectors may be used to provide additional radiation information.

Two or more of the detectors may be gamma ray detectors. Some embodiments may include radiation shielding (not shown), which may be located between radiation source 840 and sensor 830 and/or detector 820. Radiation shielding may include, but is not limited to, gamma-ray shielding and neutron shielding. Drilling fluid 890 may be present between the formation 880 and the downhole tool 810, such that emissions from radiation source 840 may pass through drilling fluid 890 to reach formation 880 and radiation induced in the formation 880 may pass through drilling fluid 890 to reach sensor 830 and/or detector 820.

In one embodiment, electronics (e.g., processing circuitry 120) associated with sensor 830 and/or detector 820 may be configured to record radiation counts from at least two axially spaced detectors (e.g., sensor 830 and detector 820). Variations in patterns may be used for analysis to determine what types of radiation are being detected, such as gamma rays, neutrons having different energy levels, and the like. The circuitry may generate a time-dependent ratio between axially spaced detectors by using information from multiple bursts. This detection may occur within very narrow time bins or windows (on the order of 1 to 1000 microseconds). This ratio may be expressed as a curve or other graphical function that describes a combination of multiple ratio values. In some embodiments, the parameter of interest may be estimated using a difference between the detector counts. Herein, the term time-dependent broadly describes the property of the ratio to vary with time, as opposed to a ratio that remains constant, such as may occur with a continuous radiation source. In some embodiments, the time-dependent ratio may be weighted. The axially spaced detector count rate ratios may be obtained as a function of time and graphically illustrated as a time-dependent ratio curve. Various properties of the formation may be determined using the time-dependent ratio curve, including, but not limited to, porosities of the formation.

In other embodiments, such electronics may be located elsewhere (e.g., at the surface). To perform the treatments during a single trip, the tool may use a "high bandwidth" transmission to transmit the information acquired by sensor 830 and/or detector 820 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the treatment activity in "real time." Processing of the responses attributable to radiation counts in sensor 830 and/or detector 820, respectively, allows for estimation of parameters of interest, such as, for example, porosity, density, etc.

Also disclosed are borehole investigation methods for estimating formation properties using calibrated radiation information, particularly for estimating parameters of interest of a formation. The method may include using neutron or gamma ray count rate information from a detector to model porosity, shale content, or salinity, or other parameters of interest. Devices disclosed herein may include at least one processor and storage subsystem with a program that, when executed, implements a disclosed method.

Figure 9:
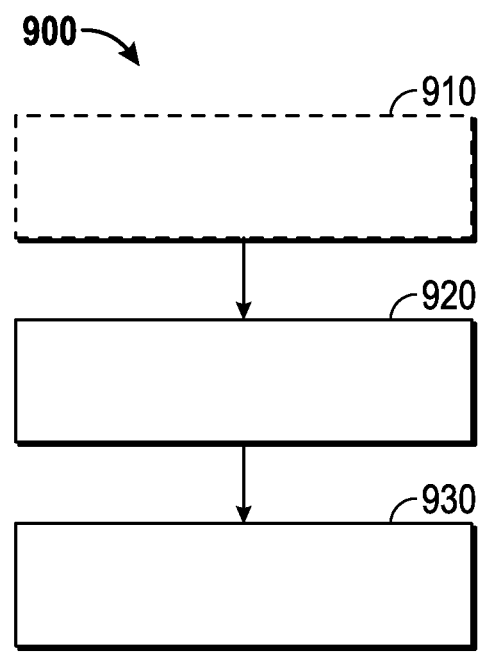
FIG. 9 shows one method for estimating at least one parameter of interest of the formation.

FIG. 9 shows, in flow chart form, one method 900 according to the present disclosure for estimating at least one parameter of interest of the formation 80 (FIG. 1) using a model relating gamma ray information acquired from at least gamma ray detector (e.g., sensor 150) to the parameter of interest.

In one example, models may relate the natural gamma ray energy spectrum to elemental concentrations of potassium- 40, and the uranium and thorium series (collectively, 'KUT concentrations') in a volume. This spectrum is a linear combination of spectra from all three components, which may be represented as $$Y(E)=aK(E)+bU(E)+cTh(E)$$

where a, b and c are usually known as the yields and K(E), U(E) and Th(E) are energy spectra to K-40 radioisotope, uranium and thorium series. Y(E) is the total spectrum recorded by the detector. The yields a,b,c can be determined by various methods. One method involves the use of individual K, U, and Th elemental spectra and determine the yields using an algorithm that minimizes the error. Another method is to integrate certain segments of Y(E) and use those values as representatives of K-40, U and Th. With yields determined, they may be correlated to the elemental concentrations of K-40, uranium and thorium in the formation. Other naturally radioactive or activated elements may also be similarly identified. Models may further relate elemental concentrations to the location and extent of hydrocarbons in the formation.

Referring now to FIGS. 1, 2 and 9, method 900 may include optional step 910, where the radiation source 40 emits neutrons in proximity to the formation 80. In step 920, radiation information relating to gamma rays (or alternatively neutrons) may be collected by a device including a radiation detector, such as device 110. The radiation information may be calibrated radiation information obtained using a method in accordance with embodiments relating to FIGS. 6 and 7. In step 930, density of the formation 80 may be estimated by applying one or more count rates from a detector to the model. Information collected by the detector(s) (e.g., sensor 150) may be used to generate radiation information and derivative information. The estimation of formation density may also include comparison or combination of the radiation information with reference information. In some embodiments, estimation methods 900 may include step 940, where reference information on the formation or formations generally is accessed. Reference information may be combined with radiation information in step 930 to estimate density of the formation.

Herein, the term "information" may include, but is not limited to, one or more of: (i) raw data, (ii) processed data, and (iii) signals. The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions.

Referring again to FIG. 8, certain embodiments of the present disclosure may be implemented with a hardware environment that includes an information processor 811, an information storage medium 813, an input device 817, processor memory 819, and may include peripheral information storage medium 809. The hardware environment may be in the well, at the rig, or at a remote location. Moreover, the several components of the hardware environment may be distributed among those locations. The input device 817 may be any data reader or user input device, such as data card reader, keyboard, USB port, etc. The information storage medium 813 stores information provided by the detectors. Information storage medium 813 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 813 stores a program that when executed causes information processor 811 to execute the disclosed method. Information storage medium 813 may also store the formation information provided by the user, or the formation information may be stored in a peripheral information storage medium 809, which may be any standard computer information storage device, such as a USB drive, memory stick, hard disk, removable RAM, or other commonly used memory storage system known to one of ordinary skill in the art including Internet based storage. Information processor 811 may be any form of computer or mathematical processing hardware, including commercially available processors and Internet-based hardware. When the program is loaded from information storage medium 813 into processor memory 819 (e.g. computer RAM), the program, when executed, causes information processor 811 to retrieve radiation information from either information storage medium 813 or peripheral information storage medium 809 and process the information to estimate a parameter of interest. Information processor 811 may be located on the surface or downhole.

"Radiation responsive" is defined as the characteristic of producing a detectable emission in response to absorbing radiation such that the absorbed radiation is quantifiable according to the emissions. For one class of radiation responsive materials, these emissions are photons produced by scintillation. In scintillation, light is emitted as a result of the absorption of radiation, such as, for example, a neutron, a gamma ray, etc.

Substantially preventing exposure may be defined as exposure below 10 percent, 5 percent, 2 percent, 1 percent, 0.5 percent, 0.2 percent, 0.1 percent, or less of the maximum, minimum, or average radiation exposure value during exposure for calibration.

By stationary it is meant that the device does not move with respect to the surrounding wellbore/earth formation. By "substantially stationary," it is meant movement at a rate sufficiently low to allow use of the sensor to determine a parameter of interest of the formation or to determine radiation information pertaining to an adjacent segment of the formation, examples of such a rate including, for example, fewer than 1 turn per minute, 20 turns an hour, 10 turns an hour, 1 turn an hour, and so on, down to and including zero rotation for rotational motion; fewer than 1 foot per minute, 20 feet per hour, 10 per hour, 1 foot per hour, and so on, down to and including zero movement for translational movement. Continuous exposure refers to an uninterrupted period of exposure, for example, for the duration of formation measurement, or for a duration longer than an hour, 30 minutes, 20 minutes, 10 minutes, 5 minutes, or 1 minute. Continual exposure refers to a succession of brief exposures. "Redundant" information may refer to information pertaining to an adjacent segment of the formation for which radiation information has been obtained immediately prior to the acquisition of the redundant information. For example, sensor information acquired throughout a stationary period of the sensor (without modification of the sensor) will be redundant to information acquired at the beginning of the stationary period.

The present disclosure is susceptible to embodiments of different forms. While the present disclosure is discussed in the context of a hydrocarbon producing well, it should be understood that the present disclosure may be used in any borehole environment (e.g., a geothermal well). There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. A method for evaluating a parameter of interest of a formation intersected by a borehole, comprising:
   autonomously intermittently exposing a radiation sensor associated with a drilling assembly in the borehole to a calibration radiation source.

2. The method of claim 1, further comprising exposing the radiation sensor to the calibration radiation source while a measurement operation using the radiation sensor is suspended.

3. The method of claim 1, further comprising exposing the radiation sensor to the calibration radiation source when movement of the radiation sensor in the borehole falls below a threshold value.

4. The method of claim 1, further comprising exposing the radiation sensor to the calibration radiation source during a period of time in which the radiation sensor is stationary relative to the formation.

5. The method of claim 1, further comprising exposing the radiation sensor to the calibration radiation source during interruption of drilling operations.

6. The method of claim 5, further comprising exposing the radiation sensor to the calibration radiation source when rotation of a component of the drilling assembly falls below a threshold value.

7. The method of claim 1, further comprising:
   conducting measurement operations in the borehole by processing a response from the radiation sensor with measurement circuitry before the exposure to produce measurement information;
   autonomously conducting calibration operations by processing a calibration response from the radiation sensor with the measurement circuitry during the exposure to produce calibration information; and
   conducting measurement operations by processing another response from the radiation sensor with the measurement circuitry after the exposure to produce calibrated measurement information in dependence upon the calibration information.

8. The method of claim 7, further comprising using the calibrated measurement information to estimate the parameter of interest.

9. The method of claim 1, wherein the exposure and the suspension occur at predetermined intervals.

10. The method of claim 1, wherein intermittently exposing the radiation sensor in the borehole to the calibration radiation source comprises intermittently exposing the radiation sensor in the borehole to the calibration radiation source using a downhole actuator configured to autonomously expose the radiation sensor in response to a change in operations.

11. The method of claim 10, wherein the downhole actuator is configured to autonomously expose the radiation sensor during at least one of: i) suspension of measurement operations using the radiation sensor; ii) suspension of drilling operations; iii) predetermined intervals.

12. An apparatus for estimating a parameter of interest of a formation intersecting a borehole, comprising:
    a logging device associated with a drilling assembly including:
        a radiation sensor,
        a calibrator including a calibration radiation source selectably exposable to the radiation sensor, and
        an actuator configured to autonomously intermittently expose the radiation sensor to the calibration radiation source while the device is in the borehole; and
    a carrier configured to convey the logging device into the borehole.

13. The apparatus of claim 12, wherein the calibrator includes at least one of:
    i) a continuous radiation source and at least one shield member substantially preventing exposure of the continuous radiation source to the radiation sensor;
    ii) a fixture holding a continuous radiation source and movable to a first position providing exposure of the continuous radiation source to the radiation sensor and to a second position substantially preventing exposure of the continuous radiation source to the radiation sensor; and
    iii) a controllable source.

14. The apparatus of claim 12, wherein the actuator is at least one of i) electronically controlled; ii) mechanically controlled; iii) inertially controlled; and iv) operator controlled.

15. The apparatus of claim 12, wherein the actuator is configured to expose the radiation sensor to the calibration radiation source during suspension of measurement operations using the radiation sensor.

16. The apparatus of claim 12, wherein the actuator is configured to expose the radiation sensor to the calibration radiation source during suspension of drilling operations.

17. The apparatus of claim 12, wherein the actuator is configured to expose the radiation sensor to the calibration radiation source during predetermined intervals.

18. The apparatus of claim 12, wherein the actuator is configured to expose the radiation sensor to the calibration radiation source in response to a command received from an operator.

19. The apparatus of claim 12, wherein the actuator further comprises:
    a processor; and
    a non-transitory computer-readable medium accessible to the processor having instructions disposed thereon that, when executed, cause the at least one processor to expose the radiation sensor to the calibration radiation source.

* * * * *